United States Patent
Knutson

(12) 
(10) Patent No.: US 6,280,332 B1
(45) Date of Patent: Aug. 28, 2001

(54) BI-DIRECTIONAL, DUAL WRAP SPRING, TORSIONAL COUPLER WITH DECOUPLING MEANS

(76) Inventor: Robert Charles Knutson, P.O. Box 872, Bayfield, WI (US) 54814

( * ) Notice: Subject to any disclaimer, the term of this patent is extended or adjusted under 35 U.S.C. 154(b) by 0 days.

(21) Appl. No.: 09/496,206

(22) Filed: Feb. 2, 2000

(51) Int. Cl.[7] .................................................. F16D 3/52
(52) U.S. Cl. ................................................ 464/59; 192/415
(58) Field of Search .................................. 464/57, 58, 59, 464/60, 40; 267/157, 168; 74/574, 604; 474/94; 192/41

(56) References Cited

U.S. PATENT DOCUMENTS

| | | | | |
|---|---|---|---|---|
| 1,166,379 | * | 12/1915 | Ludlam | 464/40 X |
| 3,242,696 | * | 3/1966 | Kaplan | 464/40 |
| 3,539,042 | * | 11/1970 | Sacchini | 192/41 S X |
| 3,813,953 | * | 6/1974 | Wojtowicz | 192/41 S X |
| 4,090,785 | * | 5/1978 | Weninger | 464/58 X |
| 5,391,058 | * | 2/1995 | Goto et al. | 464/57 X |
| 5,482,221 | * | 1/1996 | Peterson et al. | 192/41 S X |
| 5,620,372 | * | 4/1997 | Takada et al. | 464/57 X |
| 5,947,409 | * | 9/1999 | Corrigan, Jr. | |

FOREIGN PATENT DOCUMENTS 699 344 * 11/1940 (DE) ........................................ 464/60

* cited by examiner

*Primary Examiner*—Lynne H. Browne
*Assistant Examiner*—Grag Binda

(57) ABSTRACT

A bi-directional torsional coupler for transferring torque from a drive shaft to an integral machine element (pulley, sprocket, gear etc.), comprised of two wrap springs, each having an inner helical spring portion gripping a drive shaft and a coaxial larger diameter helical spring portion, gripping a cylindrical surface of the bi-directional torsional coupler, and surrounding the inner spring, each wrap spring wound in opposite rotational directions needed to grip the shaft to provide torque transfer in both rotational directions. Manual rotation of two end caps of the bi-directional torsional coupler facilitates quick installation, quick axial adjustment and removal from the shaft, by means for unwrapping the inner wrap spring coils from the drive shaft, releasing the torque transfer from the shaft.

2 Claims, 1 Drawing Sheet

BI-DIRECTIONAL, DUAL WRAP SPRING, TORSIONAL COUPLER WITH DECOUPLING MEANS

CROSS-REFERENCE TO RELATED APPLICATION

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

This invention relates generally to torsional couplers, and more particularly to helical wrap spring torsional couplers used in transferring rotation motion and torque from a rotational driving member to a rotational driven member. For example, a torsional coupler used for transferring torque from a shaft to a pulley.

Conventional methods of torionally coupling a machine element to a shaft are set-screws, keys, cotter pins, split collars with cross methods suffer from slow installation and removal, unpredictable and low torque transfer from the shaft to machine element and difficult or slow axial location adjuastment.

Prior art wrap spring torsional couplers are used for transferring or limiting torque, within clutches, brakes and specialty apparatus. A wrap spring transfers unidirectional torque from a conical shaped shaft to a driven pulley in Ludlam, U.S. Pat. No. 1,166,379, with the object of providing torsional resiliency and direct torque release when reversing the rotational direction of the driving member. Prior art using a single wrap spring to transfer torque include the clutches described in McGibbon, U.S. Pat. No. 1,523,772, Mehrbrodt, U.S. Pat. No. 3,905,458 and Janning, U.S. Pat. No. 3,934,690. Although different from a direct torque coupler, where the gripping action of the wrap spring transfers total torque, Takada, U.S. Pat. No. 5,620,372, Kaplan, U.S. Pat. No. 3,242,696 and Weninger, U.S. Pat. No. 4,090,785, show dual diameter wrap spring torque limiters, utilizing the unwrapping of a wrap spring resulting in controlled or constant friction slip between the wrap spring and driven member. Corrigan, U.S. Pat. No. 5,947,409, describes dual diameter wrap springs used to transfer torque while providing radial compliance for web tension control. Prior art does not describe a bi-directional torsional coupler, such as the invention, having means for releasing the wrap spring gripping action during coupling installation and coupling axial adjustment on a common cylindrical drive shaft of any length.

One object of the present invention, here after called "bi-directional torsional coupler" or "coupler", is to provide bi-directional torque transfer between a shaft and the bi-directional coupler's integral mechanical element such as a pulley, sprocket, gear or cam. The bi-directional torsional coupler contains two wrap spring coils, each wound in a direction of opposing gripping actions, thereby providing bi-directional torque transmission between a shaft and the mechanical element part (pulley, gear, sprocket or cam) of the bi-directional torsional coupler. Conventional prior art torsional power transmission couplers are uni-directional.

Another object of the present invention is to provide a means for releasing the gripping action of each of the wrap springs of the bi-directional torsional coupler, thereby allowing quick assembly to a shaft or quick dis-assembly from a shaft. A manually rotatable end cap on each end of the invention, engages each wrap spring end tang, whereby manual rotation of an end cap unwinds, and enlarges the wrap spring coil diameter, releasing the gripping action to the shaft. The releasing of gripping to the shaft also allows quick and easy axial adjustment of the bi-directional torsional coupling on a shaft. Conventional prior art wrap spring torsional power transmission couplers are not quickly assembled, are not quickly dis-assembled, and do not allow quick axial adjustment from a shaft, after installation.

The present invention is a bi-directional, dual wrap spring torsional coupler with means to decouple and relieve the gripping action to a shaft. A machine element, integral to the invention, such as a pulley, sprocket, gear or cam, is a mechanical driven member, and serves as a means for external power transfer.

The single embodiment of the bi-directional torsional coupler invention uses two conventional wrap springs (Ludlam, U.S. Pat. No. 1,166,379) having a smaller diameter, inner helical spring portion connected to and surrounded by a larger diameter outer helical spring portion; the transition between the inner and outer spring portions being of a spiral shape (Ludlam, U.S. Pat. No. 1,166,379). The two wrap springs are wound in a direction of opposing gripping actions, thereby providing bi-directional torsional transfer to a shaft. The wrap springs transmit the torque from a shaft to the an outer diameter of the bi-directional torsional coupler's machine element (pulley, gear, cam) for one direction of torque transmission and to the outer diameter of the bi-directional torsional coupling's hub for the opposite direction of torque transmission. The bi-directional torsional coupler's machine element member is rigidly attached to the coupler's hub after the manufacturing assembly of both wrap springs. The smaller diameter, inner spring coil portion of each wrap spring, wraps around, and grips a drive shaft; the larger diameter spring coil portion of each wrap spring, wraps around and grips outer diameter portions of the invention's machine element (pulley, gear, cam) or the attached hub. The spiral spring wire transition between the inner and outer wrap spring coils, as in other conventional wrap springs (Ludlam, U.S. Pat. No. 1,166,379), is supported by a spiral shaped groove (Ludlum, U.S. Pat. No. 1,166,379), to better insure tensile type wire stress and minimize wire bending stresses. The bi-directional torsional coupler invention provides means for unwrapping, and releasing the grip of each wrap spring to the shaft, wherein the coupler's rotatable end caps engage each end wrap spring inner coil tang that extend outward in an axial direction. One end cap is assembled, with rotational freedom, to the bi-directional torsional coupler's machine element (pulley, gear, cam) driven member with end cap engagement of one wrap spring end tang, and the other end cap is assembled, with rotational freedom, to the bi-directional torsional coupler's hub with the end cap engagement of the other wrap spring end tang.

DETAILED DESCRIPTION OF THE INVENTION

Figure 2:
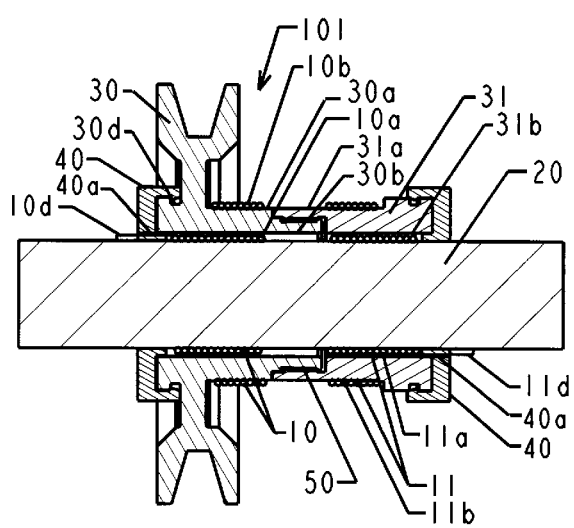
FIG. 2 is longitudinal cross-sectional view of the bi-directional torsional coupler with means to de-couple and relieve the gripping action to a shaft, according to the single embodiment of the present invention.
Figure 1:
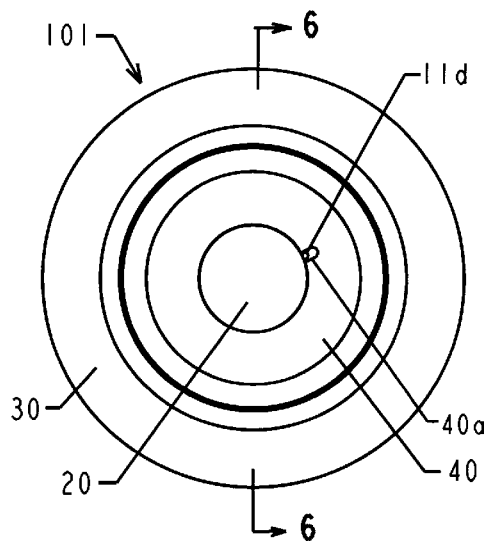
FIG. 1 is a transverse end view of the bi-directional torsional coupler with means to de-couple and relieve the gripping to a shaft, according to the single embodiment of the present invention.
Figure 3:
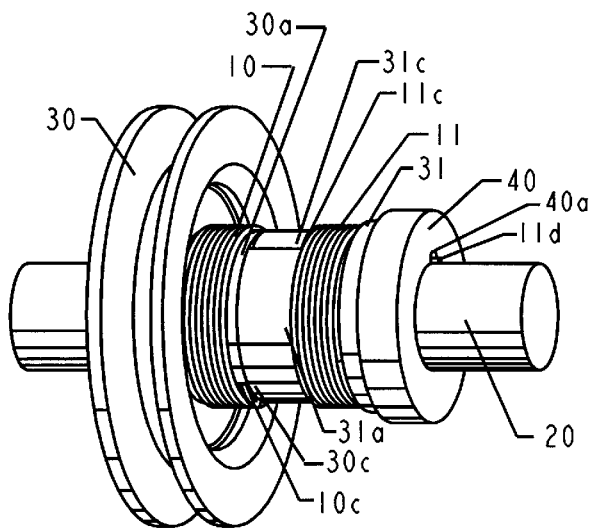
FIG. 3 is a perspective view of the bi-directional torsional coupler with means to de-couple and relieve the gripping action to a shaft, according to the single embodiment of the present invention.

The bi-directional torsional coupler 101, is shown in FIGS. 1, 2 and 3. The bi-directional torsional coupler is composed of a machine element 30, a hub 31, wrap springs 10 and 11, and end caps 40. The machine element 30 and hub 31, initially separate parts to enable wrap spring assembly are rigidly attached to each other when making final assembly. Two adjacent wrap springs 10 and 11, opposed in wrap spring coil direction, grip the shaft 20 and grip the hub of integral rigid coupler assembly of machine element 30 to additional hub 31, providing torque transfer in clockwise and counterclockwise rotation. It is obvious and known to the art, the two wrap springs can vary in wire size, wire cross-section shape, wire material and coil diameters to suit the drive torque or configuration needs. Both wrap springs 10 and 11 are comprised of coaxial inner and outer spring coil portions 10a, 10b and 11a, 11b respectively, with tangentially shaped and supported wire transitions from inner spring coil 10a to outer spring coil 10b and from inner spring coil 11a to outer spring coil 11b. Additional hub 31, with its supporting transition slot 31c, is rigidly connected to machine element 30, by threaded means 50 (or welded, pinned, glued or other means), forming an integral hub assembly with hubs for both springs of the bi-directional torsional coupler 101 (FIG.2), such that the complete coupler assembly acts as one rotational member containing both wrap springs 10 and 11 and the bi-directional torsional coupler's machine element 30 (i.e. pulley, sprocket, gear, cam etc.).

The bi-directional torsional coupler 101 (FIG. 2), including means for de-coupling the bi-directional torsional coupler from the shaft, has a rotatable end cap 40 on each end of the bi-directional torsional coupler 101, with through hole 40a, provides means for capturing the tang axial extension end portions 10a and 11a, allowing rotational unwrapping and enlargement of inner spring coil portions for quick installation, quick axial adjustment or quick removal of the bi-directional torsional coupler 101 from shaft 20. Said end caps 40 held in axial position, relative to the bi-directional torsional coupler body assembly, 30 and 31, by various means, including a preferred snap-on fit to said body. One wire tang end 11d of inner spring coil 11a is seen projecting, in an axial direction, through a hole in one end cap 40 in the bi-directional torsional coupler end view of FIG. 1.

FIG. 3 perspective view further illustrates and further clarifies the bi-directional torsional coupler invention 101, including means for releasing the gripping action to a shaft 20. The outer spring coils 10b and 11b of the two torque opposing wrap springs 10 and 11, are configured as previously described (FIGS. 1, 2). End cap(s) 40, are shown assembled to both ends of the bi-directional torsional coupler 101 and provide, as previously described (FIG. 2), a through hole 40a for engaging and unwrapping the two inner coil springs 10a and 11a, separately or concurrently, to quickly install, or quickly axial adjust or quickly remove the bi-directional coupler 101 from drive shaft 20. Drive shaft 20, normally used with the bi-directional torsional coupler 101, is preferably of suitable gripping diameter relative to the inside diameters of inner coil springs 10a and 11a and of shaft 20 length equal to or exceeding said bi-directional torsional coupler 101 axial length.

What I claim as my invention is:

1. In a wrap spring torsional coupler having a rotational driving member means; rotational driven output means and means for transferring torque, the improvement comprising:

a first wrap spring and a second wrap spring;
   said first wrap spring coil is wound in a clockwise direction,
   said second wrap spring is wound in a counterclockwise direction;
   said first and second wrap springs are coaxial and of shape and length necessary to grip said driving member and grip said driven member so as to provide torque transfer, in both rotational directions.

2. The wrap spring torque coupler of claim 1, the improvement further comprising:

a first angular adjustable end cap and a second angular adjustable end cap, coaxial to said driving and driven members;
   wherein said first angular adjustable end cap has an opening therein and first wrap spring has a tang end portion; said first end cap opening to receive said tang end portion to effect engagement and unwrapping of said first wrap spring coil to the drive members;
   wherein said second angular adjustable end cap has an opening therein and second wrap spring has a tang end portion; said second end cap opening to receive said tang end portion to effect engagement and unwrapping of said second wrap spring coil to the drive member.

* * * * *